Sept. 20, 1971   C. B. McGOUGH   3,605,408
COMBUSTION STABILIZED INJECTOR
Filed March 11, 1968

INVENTOR.
CHARLES B. McGOUGH
BY
*J. Gordon Angus*
ATTORNEY.

United States Patent Office 3,605,408
Patented Sept. 20, 1971

3,605,408
COMBUSTION STABILIZED INJECTOR
Charles B. McGough, Fair Oaks, Calif., assignor to
Aerojet-General Corporation, El Monte, Calif.
Filed Mar. 11, 1968, Ser. No. 712,124
Int. Cl. F02g 1/00
U.S. Cl. 60—39.74                          18 Claims

ABSTRACT OF THE DISCLOSURE

This disclosure relates to improvements in rocket engine injectors.

According to the present disclosure, a rocket engine injector is constructed from a plurality of discrete thin wafers, each having planar surfaces and edge surfaces. A controlled pattern of flow passages is formed in one planar surface of each wafer, each flow passage terminating at an edge surface of the wafer. The wafers are joined together in a stack and the passage terminating edge surfaces form the injector face of the injector. The flow passages are adapted to pass liquid propellant therethrough. To reduce high frequency combustion instability, short baffles or combustion stabilizers are provided as an integral part of the injector face.

According to one form of the invention, the liquid propellant is delivered to the injector face in such a manner that the fuel flows through passages on certain wafers and the oxidizer flows through passages on other wafers.

---

This invention relates to new and useful improvements in rocket engine injectors, and has as its object to provide a simple and economical propellant injector, the use of which results in high combustion efficiency, improved throttling capability, superior injector and combustion chamber cooling, and improved high frequency combustion stability.

In rocket engine injectors of the type described, atomization and intimate mixing are achieved over a wide range of flow rates of both the oxidant and fuel into the combustion chamber by providing means for introducing the two fluids into the chamber whereby there is intimate mixing in the combustion chamber. In the copending application of Richard J. La Botz, Ser. No. 489,970, titled "Improvements in Injectors" and assigned to the same assignee as the present invention, there is described an injector which is constructed of a plurality of discrete thin platelets or wafers joined together to form a unitary structure or module. Each discrete wafer contains on the surface thereof a controlled pattern of passages. The wafers are stacked to form a unitary structure, the passageways thereby forming flow paths between propellant manifolds and a large number of small injector holes arranged in a predetermined pattern on the injector face. Due to the structure and operation of the injector, the propellant cools the injector by transpiration cooling, a process whereby a surface vessel, wall, container or the like, in contact with heat energy at a temperature above capabilities of the material forming the surface, etc., can be kept cool by flow of a "cool" fluid through the material toward the heat source.

The rocket engine injector described in said La Botz application is both simple and economical to fabricate and provides a high degree of propellant atomization and intimate mixing of the fuel and oxidizer without depending upon either high injection velocities, high injector pressure drops, or complex mechanical devices. The excellent atomization and mixing make possible very high combustion efficiencies in virtually any embodiment employing the structures described therein, without necessitating a long and costly development program for each different injector model. In addition, since the injector does not depend upon either velocity or flow rate to give the atomization and mixing, it provides high combustion efficiency over a wide range of flow rate and is well adapted to throttling operation.

It has been found that in firing this type of injector, high frequency combustion instability occasionally occurs. It is believed that such instances of high frequency combustion instability are caused by the high level of atomization and mixing and the resulting short time period between injection and combustion. Combustion instability in the combustion chamber of a rocket engine is characterized by the formation of acoustic waves in one or more of the possible acoustic modes of the chamber, generally at a high cyclic frequency. When combustion instability occurs, it can destroy the combustion chamber and injector, and its elimination constitutes a major problem to the design of rocket engines. In order for such an undesirable cyclic high frequency front to continue in a combustion chamber, a sufficient concentration of fuel and oxidizer must be physically mixed and heated so that they will be ready to release enough chemical energy during the next passage of the pressure front to provide the amount of energy needed to support the front. Under normal combustion distribution patterns, the time necessary to affect this mixture and heating is usually much longer than the time of a front excursion around the combustion chamber periphery or across the chamber radius. However, the high level of atomization and mixing achieved by the injector described in the said La Botz application and the resulting short time period between the injection and combustion cooperate to provide the additional amount of energy necessary to support the movement of the front.

Due to the close proximity between the combustion zone and the injector face it has been found that the instability may be reduced or even eliminated by short baffles or combustion stabilizers. Accordingly, the present invention is directed to baffles or combustion stabilizers integral with the injector face. The surfaces of baffles or stabilizers are part of the basic injector pattern. The baffles are transpiration-cooled with propellant passing through the baffle surfaces as is the case with the remainder of the injector face.

The present invention offers significant advantages over conventional combustion-stabilized injectors in the following respects:

(1) Flexibility—Any stabilizing baffle configuration can be used, which gives great flexibility in preventing a variety of potential transverse instability modes.

(2) Cooling reliability—The stabilizers are completely transpiration-cooled with both propellants. No film cooling or regenerative cooling is required to insure the structural integrity of the baffles.

(3) Simplicity and low cost—The stabilizing baffles according to this invention are an integral part of the injector body and require no significant additional fabrication steps. They are machined into or otherwise made a part of the injector face in a relatively short time and do not add appreciably to the overall cost of the unit. No injector pattern modifications are required.

(4) Pressure drop—Since the baffles are cooled with the same system as for the injector, no additional propellant system pressure drop is required to cool the baffles.

(5) No performance degradation—Since the stabilizing baffles are an integral part of the injector pattern no performance loss results from their incorporation into the injector.

(6) Ease of baffle modification—Some modification to the stabilizer baffle pattern is possible even after initial testing. This can facilitate the selection of an optimum design.

The above and other features of this invention will be more fully understood from the following detailed description and the accompanying drawings, in which.

Figure 1:
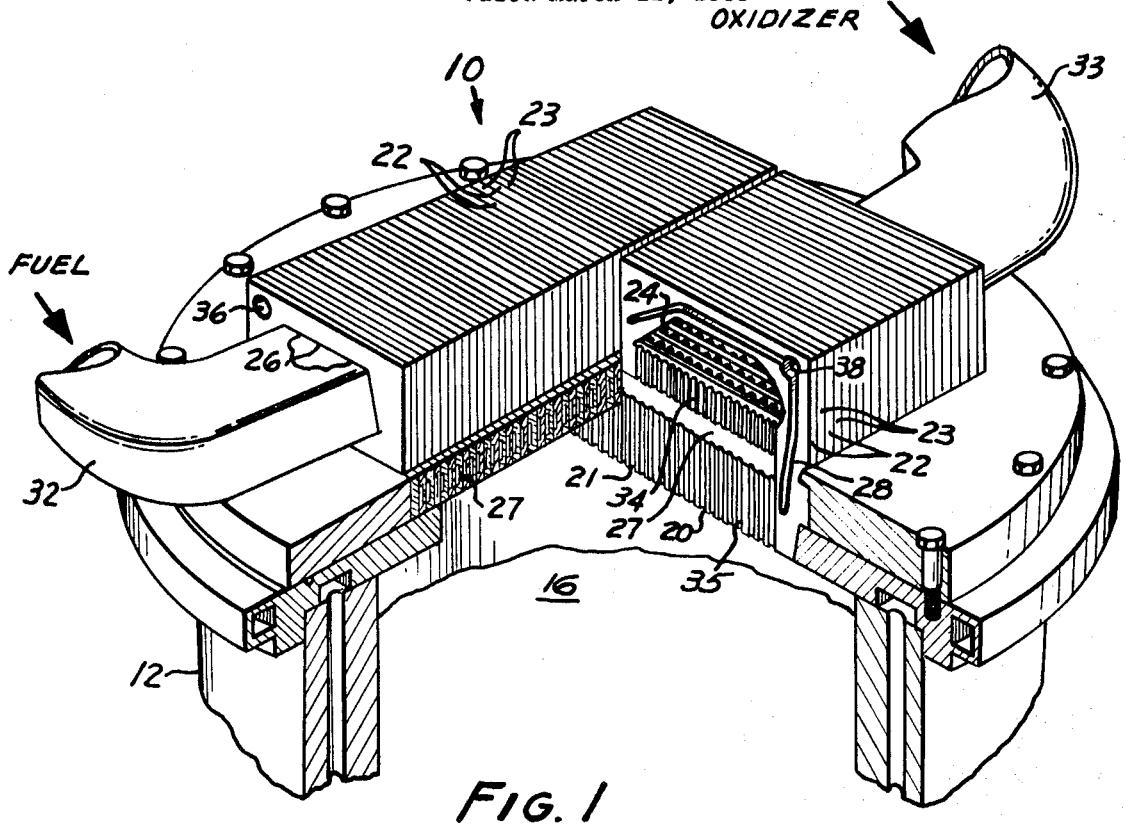
FIG. 1 is a perspective view, partially broken away, showing a typical injector of the type described as used in a rocket motor.

In the drawings, there is illustrated the presently preferred embodiment of an injector 10 according to the present invention. Injector 10 is mounted to body 12 forming combustion chamber 16 therein. Injector 10 includes an injector face 20 closing one end of combustion chamber 16. Injector 10 comprises a stack of a plurality of thin platelets or wafers 22, 23. The preferred thickness of each wafer 22, 23 is substantially between about 0.001 and 0.050 inch, with a typical thickness being 0.007 inch.

The injector face 20 resembles a porous wall, containing a large number of small holes 21 which are several thousandths of an inch across and arranged in a precise, predetermined pattern. The preferred size of injector face holes 21 have hydraulic diameters within the range of 0.0005 inch to 0.020 inch. A typical size is 0.004 inch. The term "hydraulic diameter" as used herein means four times the cross-sectional area divided by the wetted perimeter. The term "wetted perimeter" as used herein means the size of the perimeter of the passage actually wetted by the fluid, which for the purpose of this invention means the actual perimeter size. Each injector face hole 21 is connected by means of passages 35 to a distribution manifold passage 27 which provides for uniform distribution of propellant, either fuel or oxidizer, to all the passages 35 on the particular wafer. Passage 27 is, in turn, fed by passages 34 on the same wafer which are in fluid communication with either the fuel manifold or the oxidizer manifold. The fuel manifold is formed by large hole 26 through the wafers and the oxidizer manifold is formed by large hole 24 through the wafers. Passages 34 are in fluid communication with either hole 24 or 26 and are so arranged and disposed on the wafers as to distribute propellant to distribution manifold passage 27 and to passages 35 which terminate in the edge surface forming the holes 21 on injector face 20. Conventional conduits 32 and 33 are attached to the manifolds simply by making the end wafers extra heavy and welding or brazing the conduits to them.

As shown particularly in FIG. 1 and more fully described in the said La Botz application, the passage terminating holes 21 on the injector face formed by wafers 22 are in fluid communication with the oxidizer manifold while the passage terminating holes 21 formed by alternate wafers 23 are in fluid communication with the fuel manifold. Thus, the injector face illustrated in the drawings has alternate fuel and oxidizer holes. It is to be understood that other hole patterns are possible, such as mutliple rows of fuel holes and multiple rows of oxidizer holes arranged in any desired pattern. A preferred spacing between adjacent fuel and oxidizer holes is between about 0.001 inch to 0.040 inch. A typical spacing is 0.008 inch.

As explained more fully in the said La Botz application, passages 35 may be flared so that the flow resistance through each flow path is relatively insensitive to heat transfer on the injector face 20. Likewise, passages 34 may be accurately sized so as to meter propellant flow to the respective holes 21. By way of example, passages 34 have a hydraulic diameter substantially between 0.0005 inch and 0.020 inch, with a typical hydraulic diameter being about 0.004 inch.

Fuel and oxidizer vent manifolds 36 and 38, respectively, may be provided through the stacked wafers in fluid communication with suitable vent passages 28 on respective wafers. Vent passages 28 are disposed between the propellant passages and the exterior of injector 10. As explained in the said La Botz application, the primary purpose of these vent pasages and vent manifolds is to eliminate intermanifold leakage. The fuel and oxidizer vent manifolds are maintained at a pressure either above or below that of the propellant in the feed manifolds, so that if a leak occurs at any point between adjacent wafers, the leak will be intercepted by the vent passage. These vent passages and manifolds also provide an adequate means for inspecting the injector for leaks. If the fuel and oxidizer feed manifolds are pressurized, and no flow occurs through the vent manifolds, then the assembly may be assumed to be leak-free.

As explained in the said La Botz application, the grooves and passages on the individual wafers may be formed in any one of several different ways. By way of example, the flow passages may be formed by photoetching, electroplating, rolling or any other indentation or embossing process. Also, the wafers may be joined together by any one of a number of different methods, for example by brazing, diffusion bonding, resistant welding, or the use of a bonding agent. Brazing or bonding adjacent wafers together around the oxidizer manifold 24 and fuel manifold 26 assures sealing the wafers against propellant leakage.

Figure 2:
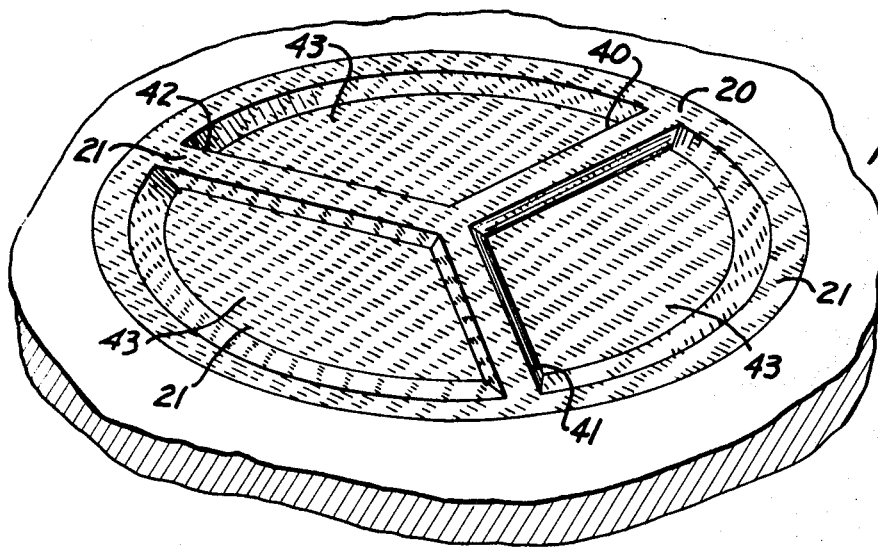
FIG. 2 is a bottom plan view of the presently preferred embodiment of the injector of the present invention showing the injector face having integral stabilizing baffles as part thereof.
Figure 3:
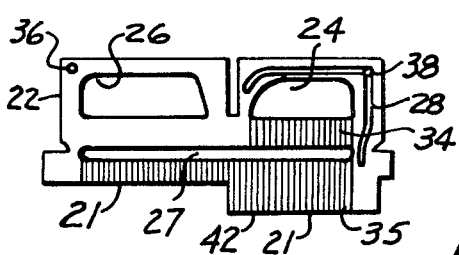
FIG. 3 is a plan view of a wafer for use in an injector according to the present invention.

As heretofore explained, it has been found that in firing the type of injector as heretofore described, high frequency combustion instability occasionally occurs. It is believed that the high frequency combustion instability is caused by the high level of atomization and mixing achieved by this type of injector and the resulting short period of time between injection and combustion. However, due to the close proximity between the combustion zone and the injector face it has been found that the instability may be reduced or even eliminated by baffles or combustion stabilizers on the injector face. In FIG. 2 the injector face 20 is illustrated as having three radially disposed baffles 40, 41 and 42 integral therewith. It is to be understood however that the number of baffles and their particular geometric configuration may be of any suitable optimum design and the particular embodiment illustrated in FIG. 2 should not be construed as limiting on the invention.

Baffles 40–42 may be formed on injector face 20 by any suitable method. One convenient method is to form the basic injector by stacking wafers 22 and 23 and then machining the face 20 of injector 10 to thereby form planar depressions 43 on the face of the injector. Depressions 43 comprise the principal area of the injector face. It is to be understood that other methods well known in the art are also applicable. For example, the depressions may be photoetched or engraved. Baffles 40–42 are thereby formed between adjacent depressions 43.

Since the baffles 40–42 are formed as an integral part of the injector, they include injector holes 21 arranged in a preselected pattern in accord with the pattern within depressions 43. Thus, the injector may be designed with an optimum hole pattern for atomizing and mixing fuel and oxidizer and may be provided with baffles 40–42 having a pattern in accordance with the optimized pattern.

In operation of an injector utilizing baffles in accordance with this invention, cyclic acoustic pressure waves initiated within a depression 43 are prevented from continuing around the full periphery of the combustion chamber due to the presence of baffles 40–42. Alternatively, or in addition, an intermediate circumferential baffle may be provided to prevent radial propagation of acoustic pressure waves. Thus, an acoustic wave developed in a depression will be diverted by a suitable baffle to dispel the acoustic wave thereby reducing or eliminating the possibility of high frequency combustion instability.

The wafers are sufficiently thin thereby providing thermal equilibrium between the walls of the wafers and the propellant passing through the flow passages. Thus, the entire injector including baffles 40–42 is maintained sufficiently cool by means of transpiration cooling. The "cool" liquid propellant flowing toward the heat at the injector face maintains the injector sufficiently cool to prevent hot spot instability and failure due to excessive temperature.

The baffle system according to the present invention may be designed for optimum performance without detracting from the hole pattern design for the propellant in the injector face. The injector designer is not limited to a fixed baffle design, but may optimize the baffle system on the injector face of an injector, even after testing the injector. Since the baffles are cooled with propellant that is ultimately injected from the baffle surfaces in the combustion chamber, the baffles present no reduction in coolant flow in the rocket thrust chamber. Furthermore, since the baffles utilize the same flow pattern of propellant as the remainder of the injector face, there is no reduction of propellant flow associated with the baffles according to this invention.

The present invention thus provides a baffle system for an injector which reduces or even eliminates the possibility of high frequency combustion instability in rocket motors. The stabilizing baffles form an integral part of the injector body and require no significant additional fabrication steps. They are machined into or otherwise made a part of the injector face, thereby resulting in an improved operation of the injector without adding appreciably to the cost of the injector. The stabilizer baffle pattern may be modified even after testing operations so that the design may be optimized for any particular rocket motor.

This invention is not to be limited by the embodiment shown in the drawings and described in the description, which is given by way of example and not of limitation, but only in accordance with the scope of the appended claims.

What is claimed is:

1. In a rocket engine having a combustion chamber and a propellant injector, said injector including a plurality of discrete wafers having planar surfaces and edge surfaces, a planar surface of each wafer having a pattern of flow pssages therein, said flow passages terminating at an edge surface thereof and forming an opening in said edge surface, said wafers being joined together in a stack to form a unitary structure, said plurality of passage-terminating edge surfaces together forming a porous injector face having a plurality of holes arranged in a controlled pattern, the spacing between adjacent edge surface holes being between about 0.001 and 0.040 inch, said injector further including means for delivering liquid propellant to said flow passages, said flow passages forming flow paths between said propellant delivering means and said plurality of holes in said porous injector face, said wafers being arranged so that the controlled pattern of holes provide mixture control across the porous injector face, the improvement comprising: combustion stabilizer means on said injector face and integral with at least some of said wafers for minimizing combustion instability in said combustion chamber.

2. A device according to claim 1 wherein said combustion stabilizer means comprises baffle means integral with and formed by a plurality of the stacked wafers forming the injector.

3. A device according to claim 1 wherein said stabilizer means comprises baffle means formed between adjacent planar depressions in said injector face, the baffle means protruding into the combustion chamber, the controlled pattern of holes being formed on said baffle means and depressions so that propellant may be discharged through holes on said depressions and said baffle means.

4. A device according to claim 1 wherein the thickness of each wafer is between about 0.001 and 0.050 inch.

5. A device according to claim 1 wherein said edge surface holes are of a hydraulic diameter between about 0.0005 and 0.020 inch.

6. A fluid injector comprising: a stack of plurality of discrete wafers having planar surfaces and edge surfaces; a pattern of flow passages in a planar surface of each wafer, each flow passage terminating at an edge surface thereof and forming an opening in said edge surface, said wafers being joined together in the stack to form a unitary structure, the passage-terminating edge surfaces together forming a porous injector face having a plurality of holes arranged in a controlled pattern, the spacing between adjacent edge surface holes being between about 0.001 and 0.040 inch; delivery means for delivering propellant to said flow passages, said flow passages forming flow paths between said delivery means and said plurality of holes in said injector face, the controlled pattern of holes providing mixture control across the porous injector face; and combustion stabilizer means on said injector face and integral with at least some of said wafers for minimizing combustion instability adjacent said injector face.

7. A device according to claim 6 wherein said combustion stabilizer means comprises baffle means integral with and formed by a plurality of the stacked wafers forming the injector.

8. A device according to claim 6 wherein said stabilizer means comprises baffle means formed between adjacent planar depressions in said injector face, the planar depressions comprising the principal area of the injector face, the baffle means protruding from the depressions, the controlled pattern of holes being formed on said baffle means and depressions so that propellant may be discharged through holes on said depressions and said baffle means.

9. A device according to claim 6 wherein the thickness of each wafer is between about 0.001 and 0.050 inch.

10. A device according to claim 6 wherein said edge surface holes are of a hydraulic diameter between about 0.0005 and 0.020 inch.

11. In a rocket engine having a combustion chamber and a propellant injector, said injector including a plurality of discrete wafers having planar surfaces and edge surfaces, a planar surface of each wafer having a pattern of flow passages therein, said flow passages terminating at an edge surface thereof and forming an opening in said edge surface, said wafers being joined together in a stack to form a unitary structure, said plurality of passage-terminating edge surfaces together forming a porous injector face having a plurality of holes arranged in a controlled pattern, said edge surface holes each having a hydraulic diameter between about 0.0005 and 0.020 inch, said injector further including means for delivering liquid propellant to said flow passages, said flow passages forming flow paths between said propellant delivering means and said plurality of holes in said porous injector face, said wafers being arranged so that the controlled pattern of holes provide mixture control across the porous injector face, the improvement comprising: combustion stabilizer means on said injector face and integral with at least some of said wafers for minimizing combustion instability in said combustion chamber.

12. A device according to claim 11 wherein said combustion stabilizer means comprises baffle means integral with and formed by a plurality of the stacked wafers forming the injector.

13. A device according to claim 11 wherein said stabilizer means comprises baffle means formed between adjacent planar depressions in said injector face, the baffle means protruding into the combustion chamber, the controlled pattern of holes being formed on said baffle means and depressions so that propellant may be discharged through holes on said depressions and said baffle means.

14. A device according to claim 11 wherein the thickness of each wafer is between about 0.001 and 0.050 inch.

15. A fluid injector comprising: a stack of plurality of discrete wafers having planar surfaces and edge surfaces; a pattern of flow passages in a planar surface of each wafer, each flow passage terminating at an edge surface thereof and forming an opening in said edge surface, said wafers being joined together in the stack to form a unitary structure, the passage-terminating edge surfaces together forming a porous injector face having a plurality of holes arranged in a controlled pattern, said edge surface holes each having a hydraulic diameter between about 0.0005 and 0.020 inch; delivery means for delivering propellant to said flow passages, said flow passages forming flow paths between said delivery means and said plurality of holes in said injector face, the controlled pattern of holes providing mixture control across the porous injector face; and combustion stabilizer means on said injector face and integral with at least some of said wafers for minimizing combustion instability adjacent said injector face.

16. A device according to claim 15 wherein said combustion stabilizer means comprises baffle means integral with and formed by a plurality of the stacked wafers forming the injector.

17. A device according to claim 15 wherein said stabilizer means comprises baffle means formed between adjacent planar depressions in said injector face, the planar depressions comprising the principal area of the injector face, the baffle means protruding from the depressions, the controlled pattern of holes being formed on said baffle means and depressions so that propellant may be discharged through holes on said depressions and said baffle means.

18. A device according to claim 15 wherein the thickness of each wafer is between about 0.001 and 0.050 inch.

References Cited

UNITED STATES PATENTS

| | | | |
|---|---|---|---|
| 2,484,123 | 10/1949 | Scherl | 239—132.3 |
| 2,735,482 | 2/1956 | Tuttle | 239—549 |
| 3,174,283 | 3/1965 | Crocco et al. | 60—258 |
| 3,200,589 | 8/1965 | Mower et al. | 60—39.46 |
| 3,242,668 | 3/1966 | Ellis | 60—260 |
| 3,289,405 | 12/1966 | Eng | 60—39.74 |
| 3,413,704 | 12/1968 | Addoms, Jr., et al. | 29—157 |

SAMUEL FEINBERG, Primary Examiner

U.S. Cl. X.R.

239—553.3, 553.5